Aug. 1, 1939.   H. N. JENKS   2,168,208
APPARATUS FOR BIOLOGIC PURIFICATION OF LIQUIDS
Filed Sept. 22, 1933
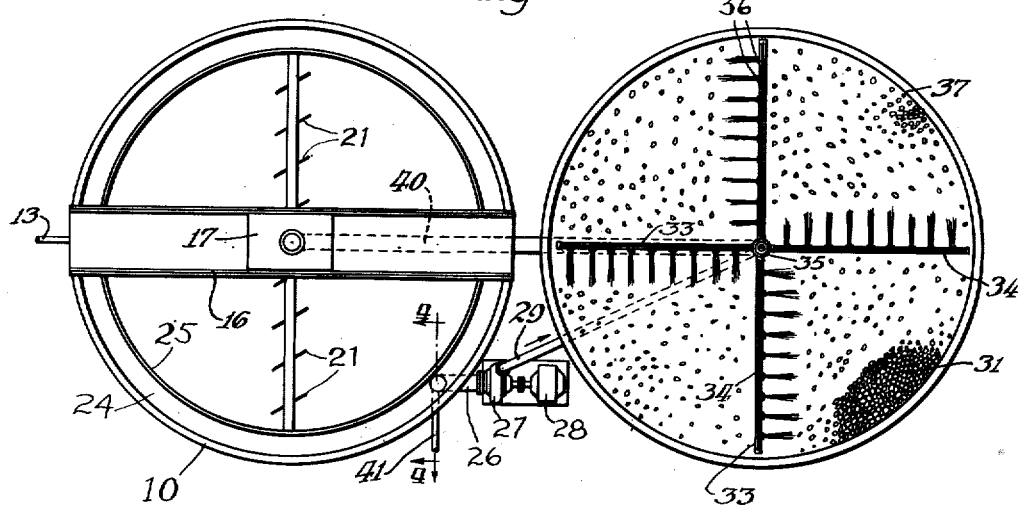
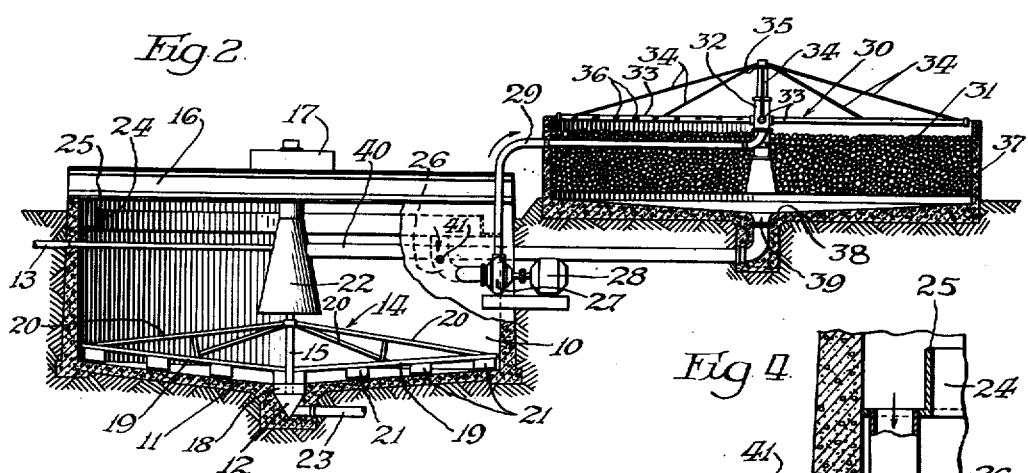
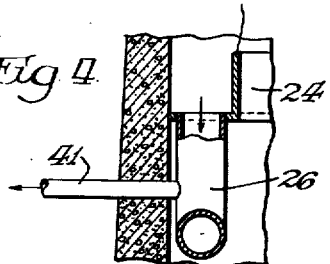
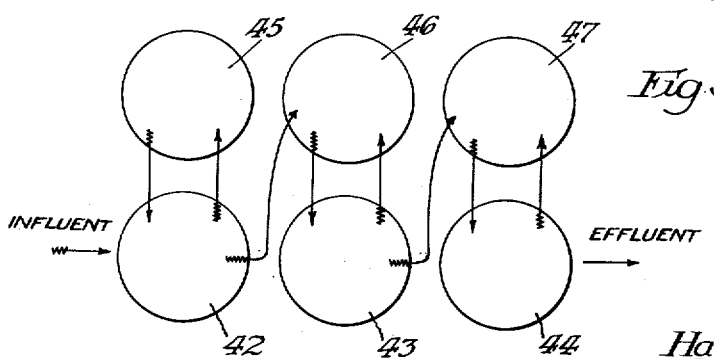
Inventor:
Harry N. Jenks Patented Aug. 1, 1939

2,168,208

UNITED STATES PATENT OFFICE 2,168,208

APPARATUS FOR BIOLOGIC PURIFICATION OF LIQUIDS

Harry Neville Jenks, Berkeley, Calif.

Application September 22, 1933, Serial No. 690,517

3 Claims. (Cl. 210—7)

The present invention relates generally to a novel apparatus for the purification or treatment of organically polluted liquids.

In the purification of municipal sewage and other organic wastes, the natural biologic processes are inherently advantageous because of the use that is thereby made of the normal life activities of the organisms inhabiting the wastes, to effect the desired conversion of the unstable, potentially offensive, organic impurities into stable and inoffensive end products.

Biochemical and biophysical phenomena are determining factors in the successful application of the three fundamental phases of sewage and trade wastes treatment, namely those involving the separation of the solids from the liquid, the disposal of the solids, and the stabilization of the liquid. My invention relates to an improvement in the means by which these objectives may be accomplished.

In current sanitary engineering practice the two recognized methods of biologic oxidation are found in the trickling filter and the activated sludge process. In either case, a fundamental principle is the establishment and maintenance of conditions favorable to the activities of aerobic microorganisms and higher forms of biologic life, which, in effecting the desired decomposition of the organic impurities, require a sufficiency of oxygen, ordinarily supplied from the atmosphere. In the case of the trickling filter the oxygen supply is derived from the natural ventilation of the filter medium, whereas in the activated sludge process oxygen is introduced by diffusing air through the liquid wastes or by suitably agitating the liquid so as to induce the absorption of the required oxygen by virtue of repeated surface contacts with the overlying air. In whatever way air is furnished, a bacterial slime or sludge is developed consisting essentially of the biologic forms responsible for the purification of the sewage or organic wastes under treatment.

The circulation of the activated sludge throughout the wastes and the accompanying continuous exposure of the liquid mixture to the atmosphere presents an advantage in point of reduction in space required for the plant structure. On the other hand, one of the chief inherent disadvantages of the activated sludge process is the formation of excessive volumes of sludge that cannot be readily dewatered or otherwise disposed of. In contrast to activated sludge aeration, the operation of a trickling filter involves the passage of the sewage or organic wastes through a stationary zone or zones of slime (zoogleal jelly) adhering to the filtering medium. The trickling filter sludge which appears as sloughings from the filter bed is less voluminous and is more readily dewatered, digested, or otherwise disposed of than is activated sludge.

I conceive that the advantages of rapid and economical biologic oxidation found in variously limited forms in both the trickling filter and the activated sludge process may be combined and enhanced in my improved bio-filtration process, and at the same time the disadvantages of large quantities of rock or other filtering media in the trickling filter, and of sludge disposal in connection with the activated sludge aeration, may be largely eliminated.

In connection with studies of biologic oxidation in general, I have observed that the aerating effect of allowing sewage to pass once over a stretch of flow of considerable length, such as is present in the self purification of natural streams, may be accomplished equally well by subjecting the sewage to a flow of short length many times. I have demonstrated experimentally that similar results may be obtained by passing sewage or other wastes through a relatively small volume of filtering material many times rather than allowing it to trickle through a large volume of rock but once, as in the conventional trickling filter. My invention therefore, embodies the novel principle of recirculation of the liquid being purified or aerated through the medium in which the organisms of purification are developed and maintained. The liquid may or may not contain the sludge that has been precipitated out by reason of the recirculation, according to whether the character of the sewage or other organic wastes being treated requires the retention or removal of the sludge or sloughings during the recirculation period, for optimum results of purification.

The entire process underlying my invention may be carried out in a single bio-filter unit, or else multiple units may be employed to effect stage treatment corresponding to the biologic zoning that occurs in an ordinary trickling filter. Also, according to this principle the recirculation of the sewage or wastes may be adjusted to the oxygen demand exerted from stage to stage. I claim therefore, as part of my invention, the means whereby such division of the process into stages and such variations in rates or recirculation can be applied as may be found desirable under any given operating conditions.

My improved bio-filter installation will comprise, in addition to the filter bed, a detention tank or basin to retain the flow within the system for a time corresponding to the required period of aeration. A series of such filter beds and tanks may be employed dependent, among other factors, upon the degree of purification desired. Although the chief function of the detention tank of my invention is to retain the wastes for the required period of recirculation through the filtering medium, it will be noted from the succeeding detailed description and specification of a typical embodiment of my invention, that the detention tank may also serve the additional purpose of a settling tank whereby the precipitated solids may be progressively removed from the system as they are produced, through bio-flocculation or otherwise, during the operation of my bio-filtration process. It should also be pointed out that a mutual precipitating effect may also be secured through the admission of the raw sewage or wastes, without prior sedimentation, into the combined detention and settling tank.

The foregoing and other objects are accomplished by my invention through providing a construction and an arrangement of component parts in the manner hereinafter described and particularly pointed out in the appended claims:

Referring to the drawing:

Fig. 1 is a top plan view of a typical design for a bio-filter in which my process for the purification of liquids may be carried out;

Fig. 2 is the corresponding sectional elevation of the apparatus shown in Fig. 1;

Fig. 3 is a diagrammatic view of a plurality of units connected together, illustrating a typical flow of the liquids through a bio-filtration plant; and Fig. 4 is a cross sectional view taken on the line 4—4 in Fig. 1.

In carrying out my process, the apparatus may assume numerous physical forms, of which the accompanying drawing is but one example. My invention relates particularly to an improved system of sewage and organic wastes treatment rather than to any specific engineering plant design. Several standard forms of engineering structures and equipment are available as means employable in my system, and I do not claim broadly as my invention such items as a settling tank, a biologic trickling filter, or their appurtenant sludge removal and sewage distributor equipment as such. But I do claim as my invention the novel arrangement and the combination of units and equipment illustrated in the drawing above referred to, and such modifications in form and dimensions as engineering considerations may dictate in practice.

Referring to the drawing, particularly Figs. 1 and 2, I have illustrated one unit and one form of apparatus in which my process may be carried out. This unit comprises a settling or retention tank for holding liquid material undergoing treatment. The tank which is generally indicated by the reference character 10, may be made in any size or form and from any suitable material, but in the present illustration is made of concrete and is preferably (though not necessarily) circular in form. The floor 11 of the tank inclines toward the center to a sludge drain recess or sump 12 to which a sludge drain 23 is connected. In the embodiment of the invention disclosed in Figs. 1 and 2 of the drawing, my improved bio-filtration system includes the unique feature of combining in a single structure the function of a detention and settling tank. The purpose of this is to enable the bio-flocculated sludge and sloughings from the filter bed or porous medium hereinafter described to be removed continually from the purification system by a sludge removal apparatus generally indicated by the reference character 14. This sludge removal apparatus includes briefly a vertically extending shaft 15, having its upper end journaled in a suitable bearing in the tank bridge 16. This shaft is driven by a motor (not shown) and a reduction transmission mechanism diagrammatically indicated by the reference character 17. The lower end of the shaft is centrally supported in the recess 12 of the bottom 11 by a collar or steady bearing 18. Secured to the shaft 15 and projecting from the opposite sides thereof, are two arms 19 which are suitably supported by braces 20. Secured to and extending downwardly with respect to the arms 19, are angularly disposed spaced apart scrapers 21 which scrape the bottom the retention tank and direct or impel the deposited or settled sludge toward the sludge drain. The motor actuated shaft 15, the projecting arms 19, the arms supporting braces 20 and the sludge-engaging elements or scrapers carried from the arms constitute an assemblage of parts which operatively function to collect, impel and transfer sedimented material to the sludge drain or sediment-discharge leading from the tank and is sometimes referred to as a travelling sludge-removing or sludge-discharge mechanism functioning in the tank for removing or transferring sedimented material or settled sludge therefrom.

It should be understood however, that under certain circumstances, it may be advisable to retain all or a part of this sludge within the system in order to keep the porous medium fully impregnated with active biologic life, and further, to assist in the sedimentation, by mutual precipitation and entanglement of particles, of the sludge entering the plant with the raw sewage or wastes, thus permitting the omission of the preliminary sedimentation of the influent in an additional structure, a possibility that obviously reduces the construction cost of the bio-filtration plant as a whole.

Secured to the tank bridge 16 is a liquid-combining means and diffuser 22 in the form of a conically-shaped member. Connected to the diffuser is an influent conduit or supply duct means 13 through which the sewage or liquid to be treated is discharged into the retention and settling tank 10. Encircling the upper inner edge of the tank is an annular partition 24 which forms an effluent trough or channel therearound that is relatively remote from the delivery portion of the diffuser 22, or as otherwise expressed, from the delivery portion of the supply duct means which from one point of view may be considered as including not only the influent conduit 13, but also the liquid-combining member or diffuser 22. This channel in effect forms a weir edge as shown at 25 for drawing off the liquid from the retention tank. Communicating with the bottom of the channel 24 is an elbow 26 which in turn is connected to a recirculation pump 27. The pump 27 is driven by a motor 28. The discharge end of the pump 27 is connected by a conduit 29 to a revolving distributor apparatus generally indicated by the reference character 30 which distributes the liquid evenly over the filter bed 31. This distributor comprises a revolving riser 32 which has fastened thereto four radially projecting equally spaced apart pipes or conduits 33. The outer ends and intermediate portions of these pipes are supported by braces 34, which in turn have their inner end secured to a collar 35. Each of these distributor pipes or arms are provided with a plurality of apertures or outlets in these arms in the manner indicated in Fig. 1 of the drawing, it causes the distributing apparatus to revolve and equally distribute the liquid over the surface of the filter bed 31. The trickling filter bed 31 of discrete material is in effect in closed-circuit or cyclic sequence with the detention tank 10 whereby recycled material follows a flow-path cyclically including the aerobic biologically-active filtering and treating bed 31 and the detention tank 10.

While it is true that my bio-filtration process may be complete in itself for the purification or treatment of sewage and/or organic wastes, yet I do not wish to limit myself in this respect, inasmuch as my process or cyclic treatment system may often be incorporated in a sewage treatment works having other and additional structural and functional units, such as coarse and fine screens, final settling tanks, sludge digesters, and sludge beds and drying equipment. What I claim as my invention is the means of bio-filtration as such and in combination with any and other purification or physical plant units.

In the operation of experimental bio-filtration units, I have shown that clogging and filter flies and odors, characteristic of conventional trickling filters, are notably absent, attributable in large measure to the flushing effect and maintenance of highly aerobic conditions within the filtering medium 31 as a result of the relatively high rate of flow maintained through the filter bed. On the other hand, it has been definitely demonstrated that no detrimental influence on the biologic efficiency of the bacterial jelly (zooglea) adhering to the filtering medium is present; on the contrary I have found that under the conditions of operation of my process the oxidizing capacity of the organisms is greatly enhanced over that exhibited by them under the less favorable environmental conditions in the trickling filter or the activated sludge process.

In point of economy, I claim for my invention the advantages of substantially lower construction and operating costs, than for conventional methods of treatment. Compared to the high capital cost of a trickling filter installation, my process involves, as revealed by extensive research, the use of a quantity of discrete filtering material, such as crushed rock, of the order of magnitude of one-half the area of bed, and one-half to one-third the customary depth. Thus the volume and cost of this item of expense, which is the most important in biologic filter construction, is reduced to one-quarter to one-sixth the usual amount. As compared with filter depths of between six and eight feet, I find it desirable and thoroughly practicable to use depths ranging from two to four feet. Customary rates of filtration based on the ratio of the flow through the plant and the area of the filter beds are commonly about two million gallons per acre per day (m. g. a. d.) whereas in my system according to the process carried out therein, I use rates of 4 m. g. a. d. and upwards or as what is substantially the same thing when otherwise expressed a distribution over the filter bed at a daily rate upwards of 800 gallons per cubic yard of filter-bed material. It will be recognized that the rate of recirculation is independent of the rate of flow through the plant and furnishes the basis of certain of my appended claims of invention. I have found that for domestic sewage and certain industrial wastes this rate will be of the order of magnitude of 24 to 72 m. g. a. d. Such high rates of flow through a relatively shallow biologic filter medium constitutes a feature of my process contributing to its efficiency. Moreover, the possibility of varying these rates of recirculation within wide limits quite evidently permits my process to accommodate itself to large fluctuations in volume and/or concentration of the wastes to be purified, which is not possible in conventional plants where the capacity of a filter is strictly limited by its fixed physical dimensions, and the activated sludge process by its compressed air supply.

In the selected form of the filter bed illustrated in the drawing, I have positioned the same at an elevation slightly above the retention tank. In this form the filter bed 31 is made of any suitable material and is mounted in a circular tank 37 (though any other shape may be employed). The bottom of this tank, as shown at 38, inclines toward the axial center thereof to a drain 39 which is connected by a conduit or filter-discharge duct means 40 to the liquid combiner and diffuser member 22 for returning the liquid to the retention and settling tank 10 in the process of recirculation.

When the unit is running in continuous operation an amount of liquid is bled off effluent pipe 41 connected to the elbow 26 equivalent to the amount of liquid entering the influent pipe 13.

The filter-bed-discharge conduit or return duct 40 that conducts the effluent or liquid-discharge from the filter-bed 30, and the influent conduit or supply duct 13 both deliver the liquid material passing therethrough into the liquid-combining means 22, the latter of which functions both as a combining or mixing means and also as a discharge section for the ducts. Otherwise expressed, the diffuser 22 delivers the liquid passing therefrom into a section which is ahead of or prior to the subjecting of the liquids to quiescent sedimentation in the tank, namely, into a section or region relatively remote or distant from the overflow weir 52 of the marginal effluent launder 24. Within the quiescent sedimentation zone of the detention tank the flow of liquid therethrough is retarded and is relatively slow, and purposely so, whereby quiescent conditions favorable to sedimentation can always continue to exist and wherein a prolonged period of detention for the liquid being treated is realized. This diffuser or central feedwell member 22, as it is sometimes referred to, functions to combine or bring together the returning filter-bed discharge and the incoming liquid or new feed supply so that it delivers the mixture of such liquids in a tank section which is functionally distant any normal overflow section of the tank whereby the combined or mixed liquids mingle with the liquid undergoing sedimentation in the tank prior to release from the tank. In this manner there is avoided, or substantially held to a minimum, any direct or short-circuiting flow of the delivered liquid across and from the detention tank. This gives insurance against premature release from the system of non-purified liquid material and also assures substantial repetitive cycling within the system.

Another advantage made possible by the retention of the sludge within the recirculation system, is the aerobic digestion of the sludge itself within the porous filter medium. I have determined by experiment that by such means it is possible both to reduce the volume of the sludge eventually to be disposed of, and to render such sludge readily settleable in a settling tank of the cyclic treating system or of the bio-filtration plant. The sludge, moreover, becomes highly stable in composition in comparison with the putrescibility of ordinary sludges.

When the precipitated organic matter is to be retained in the bio-filtration system, the combined detention and settling tank 10 becomes primarily a detention tank or means whereby the liquid flow is retained and delayed in the plant for the time corresponding to the period of recirculation required by the oxygen demand of the sewage and/or wastes being treated. In such an event, the detention tank would be of such volumetric capacity as to delay transit of the liquid through the tank between the inlet and outlet thereof for purification purposes, as well as of such volumetric capacity for clarification or sedimentation purposes whereby suspended solids because of the delay of the liquid in the tank will be deposited as sludge on the bottom of the tank. Such sludge, even though from liquid that has been subjected to treatment, contains impurities of a putrescible nature that will revert and become septic. Septicity upsets sedimentation. The sludge raking or sediment-removal mechanism is therefore employed for collecting and discharging the sedimented material before septicity sets in. In contrast to existing methods of treatment, I depend in my process on a porous medium or filter means 31, external to the detention tank, for the required aeration and oxidation of the liquid wastes. In the activated sludge process, aeration is accomplished within the detention tank.

From the above description it will be seen that my improved system enables one to substitute inexpensive pumping for the relatively costly compression of air or mechanical agitation of the sewage in the activated sludge process. Reverting to my shallow filter-bed depths of which a typical depth of filter medium is three feet, it may be seen from Fig. 2 that the static lift from the elevation of the weir edge 25 and effluent trough 24 to the distributor outlets 36 is less than five feet. Accordingly an inexpensive large-capacity low-head pump 21 is required as the chief operating means for my process. The total power requirements of operation of a bio-filtration plant per million gallons treated will be approximately one-half those of the conventional activated sludge plant, and will compare favorably with those of the trickling filter. The period of recirculation for complete treatment of sewage is from four to six hours.

I have shown in the accompanying drawing circular tanks and filter beds, and have also indicated the positions and arrangement of influent 13 and effluent 41 connections. It should be understood that I do not wish to limit myself to any such particular form or arrangement, inasmuch as my process is capable of being applied in plants of widely differing layouts and details. For example, the detention and/or settling tanks may be rectangular or any convenient shape as may also be the bio-filter beds; and the relative positions of influent and effluent and recirculation piping may be altered to suit the particular structural design adopted or the functional requirements imposed.

It is to be noted that short-circuiting of the flow through the detention tank should be minimized as much as possible through proper positioning of the inlet and outlet I prefer in general to arrange any influent or return-duct means leading to the quiescent sedimentation portion of the detention tank and the outflow means leading from the tank in a manner to hold any short-circuiting of the flow to a negligible amount. This may be seen from Fig. 3 of the drawing in which I have shown diagrammatically the manner in which a plurality of units are connected together. In this view the retention and settling tanks are designated by the reference characters 42, 43 and 44, and corresponding filtering beds are indicated respectively by the reference characters 45, 46 and 47. Obviously any given portion of the total flow that may have remained in tank 42 less than the theoretical detention period will, according to the law of probabilities, not be the same portion that may short-circuit through tank 43; and the same consideration holds true for tank 44 and succeeding tanks, if any.

Referring further to Fig. 3, I have here indicated diagrammatically the course of the flow through a bio-filtration plant provided with a plurality of tanks and filter beds, and at the same time have indicated the recirculation of the sewage in relation to the progress of the flow through the plant. This diagram will serve to illustrate in part certain of the principles I claim hereinafter as part of my invention, particularly those relating to stage treatment. By this is meant the assignment of different parts of the plant to specific functions involving usually the establishment of a system of treatment within the treatment process as a whole. Thus in Fig. 3, whether or not there is actually a definite physical separation of tanks 42, 43 and 44 and a corresponding separation of filter beds 45, 46 and 47, there is a functional correspondence between successive units of the plant, so that, in the case illustrated, the initial stage of purification is accomplished in the bio-filter combination of tank 42 and bed 45; the intermediate stage is accomplished in 43 and 46; while the final stage is accomplished in 44 and 47. The value of this form of stage treatment as permitted by my improved process is appreciated in the light of the well known fact that the progressive changes that the organic matter in sewage or organic wastes undergoes during biologic purification are brought about chiefly by the action of the sewage organisms in groups, and if these groups can be kept separate, in a manner similar to the natural zoning of the organisms in the stationary layers of slime adhering to the rock of a trickling filter, then the biologic decomposition proceeds with the greatest efficiency without mutual interference of the organisms. This is a particularly useful principle in the treatment of industrial wastes where the organic polluting materials are especially concentrated.

Further consideration of Fig. 3 shows that, in cases where stage treatment, as just described, is not desired for any reason, my system permits flexibility of operation in the choice of points to which the recirculated liquid may be returned. Thus the operation may be modified so as to provide for the recirculation between any tanks and any bed, and in varying proportions of the total volume so recirculated. When multi-stage treatment is made use of it is preferred to flow sewage from the detention tank of one stage to a filter bed of a succeeding stage. In such case a possible scheme of liquid flow is from tank 42 of the initial cyclic stage to the filter bed 46 of the second or intermediate cyclic stage; from the tank 43 of the second cyclic stage to the filter bed 47 of the final stage, and finally as treated effluent from the tank of the final stage. Concommitantly recirculation might be maintained between tank 42 and filter bed 45; between tank 43 and filter beds 45 and 46; and tank 44 and filter beds 46 and 47.

While in the foregoing specification I have described my invention of an improvement in the process and means of biologic purification, it will of course be understood that modification from that disclosed in the specification may be made without departing from the spirit and scope of my invention as expressed in the following claims:

What I claim is my invention and desire to secure by Letters Patent is:

1. A purification system comprising a tank for holding the material to be purified, a filter having a porous filtering bed through which the material may trickle, an inlet duct opening into the central portions of the tank for introducing new material, means for withdrawing material from the upper portions of the tank and depositing the same on the filter bed, and a duct also opening into the central portions of the tank for leading the material trickling through the bed back to said tank.

2. A continually-operative closed-circuited liquid treatment system comprising effluent outflow means from which treated liquid is released from the system; supply duct means for conducting feed newly incoming to the system; a sedimentation tank for receiving said new incoming feed from said supply means and for holding in quiescence liquid material being treated; sludge-removal mechanism for said tank; a trickling filter-bed; discharge duct means for receiving liquid material from the filter-bed and delivering it to the interior of said tank; means for withdrawing tank liquid material from a region functionally remote from the delivery portion of said discharge duct means and for distributing it over the filter-bed at a daily rate of upward of 800 gallons per cubic yard of the filter-bed material; and means included in said duct means for combining said new feed and filter-bed-discharge liquid material prior to subjecting the combined liquids to quiescent sedimentation in said tank.

3. A multi-stage system for stage-wise application of liquid treatment which comprises a plurality of composite closed-circuited units of which one is an initial unit and one is a final unit with each including a trickling filter-bed and a sedimenting detention tank larger in volume than required for sedimentation alone, sediment-removal mechanism for the tank, duct means for passing discharge-liquid material from the filter-bed and delivering it to the interior of the tank, means for withdrawing tank liquid material from a region functionally remote from the delivery portion of said duct means and for distributing it over the filter-bed at a daily rate of upwards of 800 gallons per cubic yard of filter-bed material, inlet duct means for supplying new incoming feed for the tank of the initial unit, means associated with said duct means of the initial unit for combining the new incoming feed and material discharged from the filter bed of the initial unit prior to sedimentation in the tank of the initial unit, means for conducting liquid from the detention tank of the initial unit to the filter-bed of the final unit, and effluent outflow means from which treated liquid is released from the final unit.

HARRY N. JENKS.

---

CERTIFICATE OF CORRECTION.

Patent No. 2,168,208. August 1, 1939.

HARRY NEVILLE JENKS.

It is hereby certified that error appears in the printed specification of the above numbered patent requiring correction as follows: Page 5, first column, lines 18, 20, line 22 both occurrences, and line 26, claim 1, before the word "material" insert --liquid--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.

bed 47 of the final stage, and finally as treated effluent from the tank of the final stage. Concommitantly recirculation might be maintained between tank 42 and filter bed 45; between tank 43 and filter beds 45 and 46; and tank 44 and filter beds 46 and 47.

While in the foregoing specification I have described my invention of an improvement in the process and means of biologic purification, it will of course be understood that modification from that disclosed in the specification may be made without departing from the spirit and scope of my invention as expressed in the following claims:

What I claim is my invention and desire to secure by Letters Patent is:

1. A purification system comprising a tank for holding the material to be purified, a filter having a porous filtering bed through which the material may trickle, an inlet duct opening into the central portions of the tank for introducing new material, means for withdrawing material from the upper portions of the tank and depositing the same on the filter bed, and a duct also opening into the central portions of the tank for leading the material trickling through the bed back to said tank.

2. A continually-operative closed-circuited liquid treatment system comprising effluent outflow means from which treated liquid is released from the system; supply duct means for conducting feed newly incoming to the system; a sedimentation tank for receiving said new incoming feed from said supply means and for holding in quiescence liquid material being treated; sludge-removal mechanism for said tank; a trickling filter-bed; discharge duct means for receiving liquid material from the filter-bed and delivering it to the interior of said tank; means for withdrawing tank liquid material from a region functionally remote from the delivery portion of said discharge duct means and for distributing it over the filter-bed at a daily rate of upward of 800 gallons per cubic yard of the filter-bed material; and means included in said duct means for combining said new feed and filter-bed-discharge liquid material prior to subjecting the combined liquids to quiescent sedimentation in said tank.

3. A multi-stage system for stage-wise application of liquid treatment which comprises a plurality of composite closed-circuited units of which one is an initial unit and one is a final unit with each including a trickling filter-bed and a sedimenting detention tank larger in volume than required for sedimentation alone, sediment-removal mechanism for the tank, duct means for passing discharge-liquid material from the filter-bed and delivering it to the interior of the tank, means for withdrawing tank liquid material from a region functionally remote from the delivery portion of said duct means and for distributing it over the filter-bed at a daily rate of upwards of 800 gallons per cubic yard of filter-bed material, inlet duct means for supplying new incoming feed for the tank of the initial unit, means associated with said duct means of the initial unit for combining the new incoming feed and material discharged from the filter bed of the initial unit prior to sedimentation in the tank of the initial unit, means for conducting liquid from the detention tank of the initial unit to the filter-bed of the final unit, and effluent outflow means from which treated liquid is released from the final unit.

HARRY N. JENKS.

---

CERTIFICATE OF CORRECTION.

Patent No. 2,168,208. August 1, 1939.

HARRY NEVILLE JENKS.

It is hereby certified that error appears in the printed specification of the above numbered patent requiring correction as follows: Page 5, first column, lines 18, 20, line 22 both occurrences, and line 26, claim 1, before the word "material" insert --liquid--; and that the said Letters Patent should be read with this correction therein that the same may conform to the record of the case in the Patent Office.

Signed and sealed this 22nd day of April, A. D. 1941.

(Seal)

Henry Van Arsdale,
Acting Commissioner of Patents.